(12) United States Patent
Jee

(10) Patent No.: US 7,896,311 B2
(45) Date of Patent: Mar. 1, 2011

(54) SOLENOID VALVE OF SHOCK ABSORBER

(75) Inventor: Young Hwan Jee, Suwon-si (KR)

(73) Assignee: Mando Corporation, Seoul (KR)

( * ) Notice: Subject to any disclaimer, the term of this patent is extended or adjusted under 35 U.S.C. 154(b) by 619 days.

(21) Appl. No.: 12/002,301

(22) Filed: Dec. 14, 2007

(65) Prior Publication Data

US 2008/0179842 A1      Jul. 31, 2008

(30) Foreign Application Priority Data

Jan. 30, 2007  (KR) .................. 10-2007-0009427

(51) Int. Cl.
*F16K 31/02* (2006.01)

(52) U.S. Cl. ........ 251/129.15; 251/48; 251/51; 251/125; 188/322.13

(58) Field of Classification Search ............ 251/48, 251/50, 51, 55, 125, 129.15; 188/316, 322.13, 188/322.16
See application file for complete search history.

(56) References Cited

U.S. PATENT DOCUMENTS

| | | | |
|---|---|---|---|
| 4,512,447 A | | 4/1985 | Miura |
| 4,972,929 A | | 11/1990 | Ivers et al. |
| 5,529,154 A | | 6/1996 | Tanaka |
| 5,901,820 A | * | 5/1999 | Kashiwagi et al. ........ 188/266.6 |
| 5,934,421 A | * | 8/1999 | Nakadate et al. .......... 188/299.1 |
| 5,975,258 A | * | 11/1999 | Nezu et al. ............... 188/322.15 |
| 6,119,829 A | * | 9/2000 | Nakadate .................... 188/266.6 |
| 6,155,391 A | | 12/2000 | Kashiwagi et al. |
| 6,302,248 B1 | * | 10/2001 | Nakadate ................... 188/266.6 |
| 6,672,436 B1 | | 1/2004 | Keil et al. |
| 2005/0263363 A1 | | 12/2005 | Katou et al. |

FOREIGN PATENT DOCUMENTS

| | | |
|---|---|---|
| JP | 10073141 | 3/1998 |
| JP | 10141416 | 5/1998 |
| JP | 10184761 | 7/1998 |
| JP | 2001041272 A | 2/2001 |
| KR | 100284882 B1 | 12/2000 |
| KR | 1020060128226 A | 12/2006 |

* cited by examiner

*Primary Examiner* — John K Fristoe, Jr.
(74) *Attorney, Agent, or Firm* — McDermott Will & Emery LLP

(57) ABSTRACT

The present invention relates to a solenoid valve configured to be mounted to a shock absorber of a vehicle to adjust damping force. solenoid valve of a shock absorber in which a damping force is adjusted through adjustment of back pressure against a disc valve. The solenoid valve includes a back pressure chamber for generating back pressure against the disc valve by a fluid introduced through a back pressure adjusting flow passage, and a spool moved in a spool guide by operation of a solenoid to control opening/closing or opening rate of the back pressure adjusting flow passage. The back pressure adjusting flow passage includes a variable orifice with an opening rate of the variable orifice being adjusted by the spool and the spool guide, the back pressure chamber, and a fixed orifice formed on the disc valve.

6 Claims, 2 Drawing Sheets

SOLENOID VALVE OF SHOCK ABSORBER

BACKGROUND

1. Technical Field

The present invention relates to a solenoid valve mounted to a shock absorber of a vehicle to adjust damping force.

2. Description of the Related Art

As a vehicle becomes popularized, a level of the customer's knowledge and requirement for the vehicle gets higher, and functional performances such as output power, silence, ride comfort, handling stability and the like as well as purpose, convenience and economical efficiency of the vehicle become import selection criterions of customers who will purchase a vehicle.

A vehicle is continuously subjected to vibration or shock transmitted from the road through road wheels during driving of the vehicle. Thus, a shock absorbing device is provided between a vehicle body (or a frame) and an axle (or a wheel shaft) to prevent vibration or shock from being transmitted directly to the vehicle body, thereby improving ride comfort of the vehicle. In addition, driving stability of the vehicle is improved by suppressing irregular vibration of the vehicle body. A suspension means a coupling device, including the aforementioned shock absorbing device, between a vehicle body and an axle. In general, the suspension comprises various components, such as chassis springs, shock absorbers for suppressing free vibration of the chassis spring to enhance ride comfort, a stabilizer for adjusting a vehicle height, a rubber bushing, a control arm and the like.

In particular, a shock absorber is mounted between a vehicle body (or a frame) and a road wheel in order to serve to suppress and damp the vibration transmitted from the road. The shock absorber absorbs vertical vibration energy of the vehicle body to enhance ride comfort, protect vehicle freight, and reduce dynamic stress of each part of the vehicle body, thereby increasing durability/lifespan of the vehicle. In addition, the shock absorber suppresses movement of an unsprung mass to secure ground contact performance of a tire and suppresses a change of attitude of the vehicle caused by inertial force, thereby enhancing dynamic performance of the vehicle.

In the meantime, in order to enhance ride comfort or handling stability of the vehicle according to a road condition and driving state, a damping force variable shock absorber capable of appropriately adjusting a damping force characteristic has been developed. In general, the conventional damping force variable shock absorber controls mainly a change of damping force in a solenoid operating manner and is generally classified into a reverse type and a normal type depending on a damping force control manner.

In particular, a normal type damping force variable shock absorber is configured such that rebound damping force and compression damping force are simultaneously increased or reduced according to solenoid current. For example, a conventional normal type damping force variable shock absorber controls the damping force in the rebound and compression strokes in a soft mode by applying predetermined solenoid current and controls the damping forces in the rebound and compression strokes in a hard mode by applying solenoid current higher than the predetermined value. The damping force control is achieved in such a manner that a spool moving according to operation of a solenoid controls the generation and adjustment of back pressure in a back pressure chamber (or a pilot chamber) formed in the rear of a disc valve for varying the damping force.

However, the disc valve for varying damping force of the aforementioned conventional shock absorber comprises a plurality of discs, a ring, a retainer and the like having various sizes and shapes, so that a structure of the disc valve is complicated. In addition, there are a large number of parts of the disc valve, so that the time and effort is enormously consumed in assembling the disc valve.

BRIEF SUMMARY

According to an aspect of the present, there is provided a solenoid valve of a shock absorber in which a damping force is adjusted through adjustment of back pressure against a disc valve. The solenoid valve comprises a back pressure chamber for generating back pressure against the disc valve by a fluid introduced through a back pressure adjusting flow passage; and a spool moved in a spool guide by operation of a solenoid to control opening/closing or opening rate of the back pressure adjusting flow passage, wherein the back pressure adjusting flow passage includes a variable orifice with opening rate of the variable orifice adjusted by the spool and the spool guide, the back pressure chamber, and a fixed orifice formed on the disc valve.

The variable orifice may comprise at least one of a fluid guide groove formed on the spool wherein opening rate of the fluid guide groove is adjusted by the spool guide according to the movement of the spool, and a flow passage formed on the spool guide to be in fluid communication with the back pressure chamber wherein opening rate of the flow passage is adjusted according to the movement of the spool.

The disc valve may comprise first and second disc stacked on a ring-shaped valve sheet of a valve retainer; first and second valve springs provided to be spaced apart from the first and second discs at a certain interval by a spacer; and a disc ring interposed between an outer circumference of the first and second discs and an outer circumference of the first and second valve springs.

It is preferred that the first disc in close contact with the valve retainer has a slit opened toward an inner circumference, the second disc stacked on the first disc and in close contact with the disc ring has a slit opened toward an outer circumference, the first valve spring in close contact with the disc ring has a slit opened toward an outer circumference, the second valve spring stacked on the first valve spring does not have a slit, and the slits formed on the second disc and the first valve spring form the fixed orifice.

DETAILED DESCRIPTION

Hereinafter, an embodiment of the present invention will be described with reference to the accompanying drawings. The drawings provided are for illustrative purposes, so that the illustration for elements which are not related directly to features of the present invention will be omitted for convenience.

Figure 1:
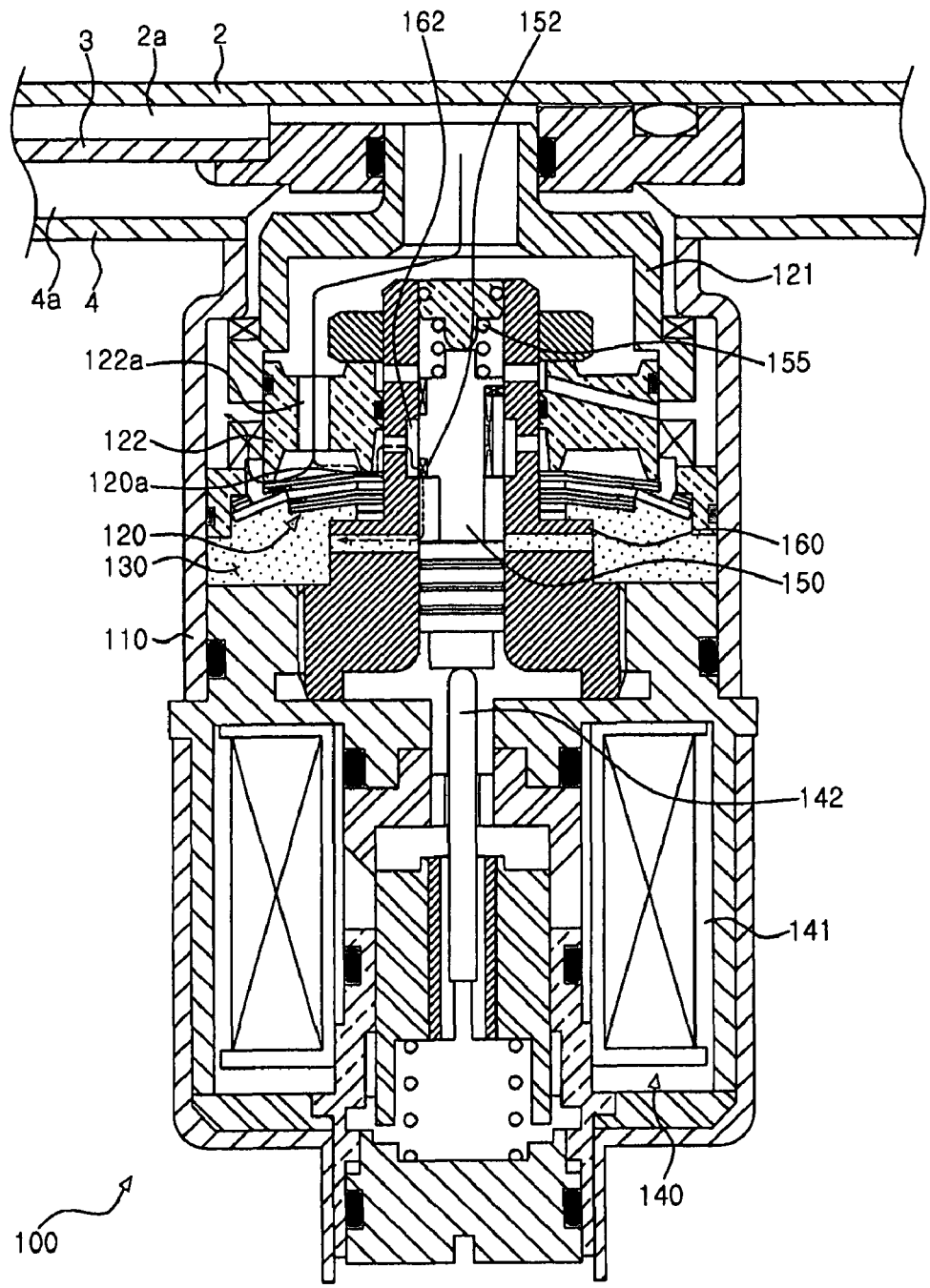
FIG. 1 is a sectional view showing a solenoid valve according to an embodiment of the present invention.
Figure 2:
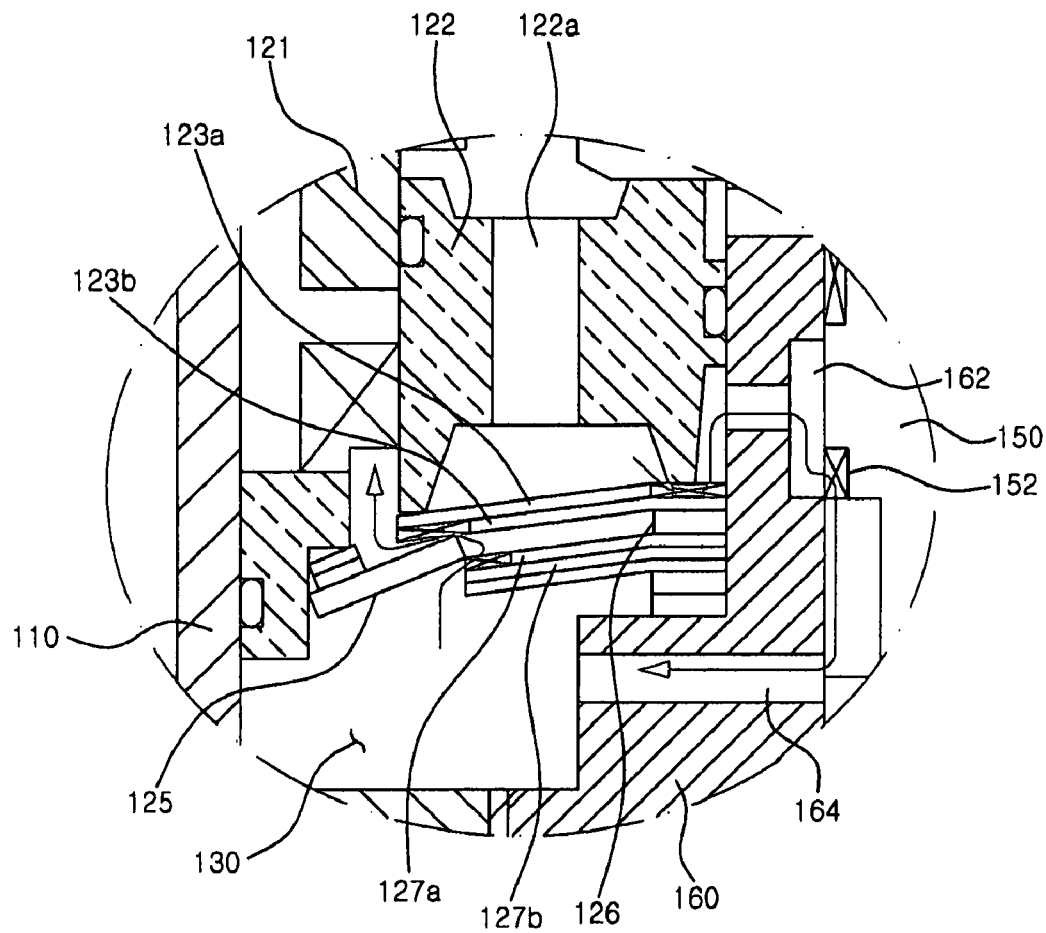
FIG. 2 is an enlarged sectional view of a major portion of the solenoid valve according to an embodiment of the present invention.

FIG. 1 is a sectional view showing a solenoid valve 100 according to an embodiment of the present invention, and FIG. 2 is an enlarged sectional view of a major portion of the solenoid valve 100.

As shown in FIGS. 1 and 2, the solenoid valve 100 according to an embodiment of the present invention is provided on an outside of a shock absorber. The shock absorber comprises an intermediate tube 3 between an internal tube 2 and an external tube 4. The shock absorber has a high pressure flow passage 2a and a low pressure flow passage 4a, which are in fluid communication with the internal tube 2 of the shock absorber through holes (not shown).

The solenoid valve 100 according to this embodiment is provided with a housing 110 coupled onto an outer circumference surface of the external tube 4 and connected to the high pressure flow passage 2a and the low pressure flow passage 4a. In addition, the solenoid valve 100 includes therein a disc valve 120 and a back pressure chamber 130, which are used for varying damping force of the shock absorber. As will be described in detail below, the back pressure chamber 130 is provided for generating back pressure at the rear of the disc valve 120 to apply pressure thereto.

The disc valve 120 is installed in a rear portion of a valve retainer 122 to cover a first flow passage 122a perpendicularly formed to the valve retainer 122. In the meantime, the valve retainer 122 is connected to the high pressure flow passage 2a of the aforementioned shock absorber through a connector 121. Accordingly, high pressure fluid introduced from the high pressure flow passage 2a through the connector 121 passes through the first flow passage 122a, and then flows toward the disc valve 120.

In addition, the disc valve 120 opposes the fluid flowing through the first flow passage 122a. In opposition against the fluid flow, the disc valve 120 is deflected backward to make the fluid return to the low pressure flow passage 4a of the shock absorber. The disc valve 120 can provide a varied damping force to the shock absorber through the aforementioned operation.

Moreover, the disc valve 120 as described above comprises a plurality of transformable discs for opposing the fluid and generating and varying the damping force through the opposition. As shown in FIG. 2, the disc valve 120 includes first and second discs 123a and 123b stacked on a ring-shaped valve sheet of the valve retainer 122, a first valve spring 127a and at least a second valve spring 127b provided to be spaced apart from the first and second discs 123a and 123b at a certain interval by a spacer 126, and a disc ring 125 positioned between an outer circumference of the first and second discs 123a and 123b and an outer circumference of the first and second valve springs 127a and 127b.

In the first and second discs 123a and 123b, the first disc 123a which is in close contact with the ring-shaped valve sheet of the valve retainer 122 has a slit opened toward an inner circumference, and the second disc 123b which is stacked on the first disc 123a and in close contact with the disc ring 125 has a slit opened toward an outer circumference.

Further, in the first and second valve springs 127a and 127b, the first valve spring 127a which is in close contact with the disc ring 125 has a slit opened toward an outer circumference, and the at least second valve spring 127b stacked on the first valve spring 127a does not have a slit.

Here, the slits formed on the second disc 123b and the first valve spring 127a form a fixed orifice.

The back pressure chamber 130 is provided such that pressure in the back pressure chamber varies itself according to the operation of a solenoid driving unit 140 (FIG. 1), so that a certain back pressure is generated at the rear of the disc valve 120 to be applied thereto. A change of the pressure in the back pressure chamber 130, i.e., the back pressure applied to the disc valve 120 causes the opposing force against the fluid passing through the first flow passage 122a to be varied, thereby providing the varied damping force to the shock absorber.

As illustrated in FIG. 1, the solenoid driving unit 140 comprises a pressing rod 142 that is moved in a fore and aft direction according to a current value of a solenoid 141. According to the embodiment of the present invention, the pressing rod 142 is moved to a location, at which a damping force in a soft mode is generated, by applying a relatively low current value (for example, 0.3 A), and to a location, at which a damping force in a hard mode is generated, by applying a relatively high current value (for example, 1.3 A).

In the meantime, the solenoid valve 100 according to this embodiment comprises a spool 150 disposed coaxially with the pressing rod 142 and linearly moved in cooperation with the movement of the pressing rod 142. The spool 150 is moved along a spool guide 160, and has one end in contact with the pressing rod 142 and the other end elastically supported by a compression spring 155. Accordingly, the spool 150 is moved forward by the pressurization of the pressing rod 142 and rearward by a restoring force of the compression spring 155.

Opening/closing and/or opening rate of a back pressure adjusting flow passage extending from an upstream side of the disc valve 120 to the back pressure chamber 130 is controlled by the movement of the spool 150 according to the operation of the solenoid, furthermore, by the interaction between the spool 150 and the spool guide 160.

In order to open/close the back pressure adjusting flow passage or adjust the opening rate thereof, the spool 150 according to this embodiment includes a fluid guide groove 152 which is in fluid communication with the upstream side of the disc valve 120 through a connecting port 162 formed on the spool guide 160. The spool guide 160 is formed with a second flow passage 164 (FIG. 2) for causing the fluid supplied from the fluid guide groove 152 to flow to the back pressure chamber 130.

An opening rate of the fluid guide groove 152 and the second flow passage 164 can be adjusted by the movement of the spool 150, and at least one or both of the fluid guide groove 152 and the second flow passage 164 form a variable orifice.

As indicated by an arrow in FIG. 2, when the back pressure adjusting flow passage is opened, the fluid is supplied to the back pressure chamber 130 through the variable orifice (i.e., the fluid guide groove 152 and the second flow passage 164), and then, supplied to the low pressure flow passage 4a through the fixed orifice (i.e., the slits formed on the second disc 123b and the first valve spring 127a). As compared with the conventional solenoid valve in which the fluid flows to a low pressure side through a fixed orifice, a back pressure chamber and a variable orifice, the fluid according to embodiments of the present invention flows to a low pressure side through the variable orifice, the back pressure chamber and the fixed orifice.

In an open state of the back pressure adjusting flow passage where the fluid can freely flow to the back pressure chamber 130 through the fluid guide groove 152 and the second flow passage 164, the back pressure in the back pressure chamber 130 is increased. On the contrary, if the fluid guide groove 152 of the spool 150 is stopped by an inner wall of the spool guide 160 or the second flow passage 164 is stopped by the movement of the spool 150, that is, if the back pressure adjusting flow passage is closed, the back pressure chamber 130 does not substantially have back pressure against the disc valve 120.

If the back pressure adjusting flow passage is opened according to the operation of the solenoid by applying relatively high current thereto and the forward movement of the spool 150 by the operation of the solenoid, the back pressure chamber 130 is filled with the fluid (indicated by a dotted line arrow in FIG. 1) flowing along the back pressure adjusting flow, this fluid generates large back pressure against to the disc valve 120. At this location, the fluid (indicated by a solid line arrow in FIG. 1) which has passed through the first flow passage 122a of the valve retainer 122 is applied to the disc valve 120 and deflects it backward, and then flows to the low pressure flow passage 4a. In this process, high damping force is generated.

If a relatively low solenoid current is applied and causes the spool 150 to be moved reward, the back pressure adjusting flow passage is closed. In this state, high pressure fluid (indicated by a solid line arrow) pushes the disc vale 120 and simultaneously generates a soft damping force, and flows to the low pressure flow passage 4a.

As described above, according to the present invention, there is provided a solenoid valve of a shock absorber, in which a valve retainer of a solenoid valve for varying damping force, which is complicated in structure and includes a large number of parts, can be configured integrally, whereby the solenoid valve can be simplified in structure and simply assembled.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

Although the present invention have been described with a specified embodiment, it will be apparent to those skilled in the art that various modifications, changes and variations can be made thereto within the scope of the present invention and the appended claims. Therefore, the aforementioned descriptions and the accompanying drawings should be construed as not limiting the technical spirit of the present invention but illustrating the present invention.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A solenoid valve of a shock absorber exhibiting a damping force, the solenoid valve comprising:
   a disc valve having a fixed orifice formed thereon;
   a back pressure chamber configured to generate back pressure against the disc valve by a fluid introduced through a back pressure adjusting flow passage;
   a spool guide;
   a solenoid unit; and
   a spool moved in the spool guide by operation of the solenoid unit to control opening/closing or opening rate of the back pressure adjusting flow passage,
   wherein the back pressure adjusting flow passage includes a variable orifice with an opening rate of the variable orifice adjusted by the spool and the spool guide, the back pressure chamber, and the fixed orifice formed on the disc valve, to adjust the damping force of the shock absorber through adjustment of the back pressure against the disc valve;
   wherein the disc valve comprises one or more discs stacked on a ring-shaped valve sheet of a valve retainer, one or more valve springs arranged on the one or more discs, and a disc ring interposed between an outer circumference of the one or more discs and an outer circumference of the one or more valve springs, and
   wherein the one or more discs in close contact with the disc ring have a slit opening toward an outer circumference of the solenoid valve and the one or more valve springs in close contact with the disc ring have a slit opening toward the outer circumference of the solenoid valve.

2. The solenoid valve as claimed in claim 1 wherein the variable orifice includes a fluid guide groove formed on the spool, and an opening rate of the fluid guide groove is adjusted by the spool guide according to a movement of the spool.

3. The solenoid valve as claimed in the claim 1 wherein the variable orifice includes a flow passage formed on the spool guide in fluid communication with the back pressure chamber, and an opening rate of the flow passage is adjusted according to a movement of the spool.

4. The solenoid valve as claimed in clam 1 wherein said one or more discs comprises: a first disc and a second disc stacked on the ring-shaped valve sheet of the valve retainer, first and second valve springs provided to be spaced apart from the first and second discs at a certain interval by a spacer.

5. The solenoid valve as claimed in claim 4 wherein the first disc is in close contact with the valve retainer and includes a slit opened toward an inner circumference thereof, the second disc is stacked on the first disc, is in close contact with the disc ring, and includes a slit opened toward an outer circumference thereof, the first valve spring is in close contact with the disc ring and includes a slit opened toward an outer circumference thereof, and the second valve spring is stacked on the first valve spring and does not have a slit.

6. The solenoid as claim in claim 5 wherein the slits formed on the second disc and the first valve spring form the fixed orifice.

* * * * *